Inventors:
Roy G. Salaman,
Robert J. Taylor,
Bernard D. Lamach,
by Russell, Chittick & Pfund Attorneys March 24, 1970 R. G. SALAMAN ET AL 3,502,814

FACSIMILE SCANNER-PRINTER

Filed Sept. 15, 1966 2 Sheets-Sheet 2

Inventors:
Roy G. Salaman,
Robert J. Taylor,
Bernard D. Lamach,
by Russell, Chittick & Pfund Attorneys United States Patent Office 3,502,814
Patented Mar. 24, 1970

3,502,814

FACSIMILE SCANNER-PRINTER

Roy G. Salaman, Bernard D. Lamach, and Robert J. Taylor, Boulder, Colo., assignors, by mesne assignments, to Phonocopy, Inc., Wilmington, Del., a corporation of Delaware Filed Sept. 15, 1966, Ser. No. 579,584
Int. Cl. H04m *11/06*
U.S. Cl. 179—4 8 Claims

ABSTRACT OF THE DISCLOSURE

A unitary facsimile scanner-printer for transmission and reception of facsimile copy over a conventional telephone network has at least one unitary scanning and printing head which includes a photoresponsive element for scanning copy to be transmitted and a conductive stylus for printing copy received. The scanning heads are mounted on an endless belt and guided along a line scanning station for either reading an indicia bearing sheet of copy for transmission or printing with the conductive stylus urged into conductive contact with a metal foil so that when the stylus is energized, a localized portion of thermotransfer material placed on the side of the foil opposite the stylus is fused and transfers from the foil to a sheet of paper to produce an image thereon. The stylus and photoresponsive element are electrically connected to a binary translation unit, which in turn is coupled to a telephone handset.

This invention relates generally to facsimile systems and more particularly to a facsimile system providing a unitary station capable of being coupled to an ordinary telephone handset for transmitting facsimile copy over the switched telephone network.

Facsimile systems in the past have been provided for the transmission and reception of half tone images and which have been utilized as relatively large specialized units connected to leased lines for the purpose of transmitting the data. The adaptation of facsimile systems for use with ordinary telephone lines has been proposed in the past but such proposals have generally involved only an extension of known techniques for the transmission of half tone images even though the primary traffic load for an instrument of this type consists almost entirely of black on white information. Due to the limited bandwidth of the telephone system, the speed at which the prior systems could operate has been limited and the results of trying to transmit the data that includes half tone information has been so unsatisfactory that equipment of this type has not reached any significant scale of commercial utility.

The present invention provides a unitary device which may conveniently be mounted on a desk top and which is not unduly bulky with provisions for using the device either to transmit black on white original copy or receive a facsimile of such copy that has been sent from a remote station with the received copy having extremely good black on white fidelity. This system is arranged to accomplish this result using the ordinary telephone line and the ordinary telephone handset is coupled to the instrument thereby permitting a telephone subscriber equipped with the device to send good quality black on white transmissions to any similarly equipped subscriber in the telephone system without restriction as to his location. By transmitting only binary signals representing black on white information and utilizing a unique printer which prints black on white without any grey scale capability, high quality reproduction can be obtained at reasonable speed over the narrow band telephone line network.

Accordingly the principal object of the present invention is to provide a unitary scanner-printer for the transmission and reception of high quality facsimile information over an ordinary telephone network.

Another object of this invention is to provide an improved printer which is capable of reproducing directly from an electrically energized stylus a high quality image by the generation of localized heat with the stylus in contact with an electrically conductive metal foil that is coextensive with the field scanned by the stylus.

A further object of the invention is the provision of an arrangement which has a unitary scanning and printing head that simplifies the synchronized operation of remote units and associated feeding means for utilizing the device either for the transmittal of copies inserted into the machine or for the reproduction of facsimile copy using special foil and paper sets which are stored in the machine.

These and other objects of the invention will become apparent from the following detailed description taken in conjunction with the accompanying drawings wherein.

Figures 1, 5:
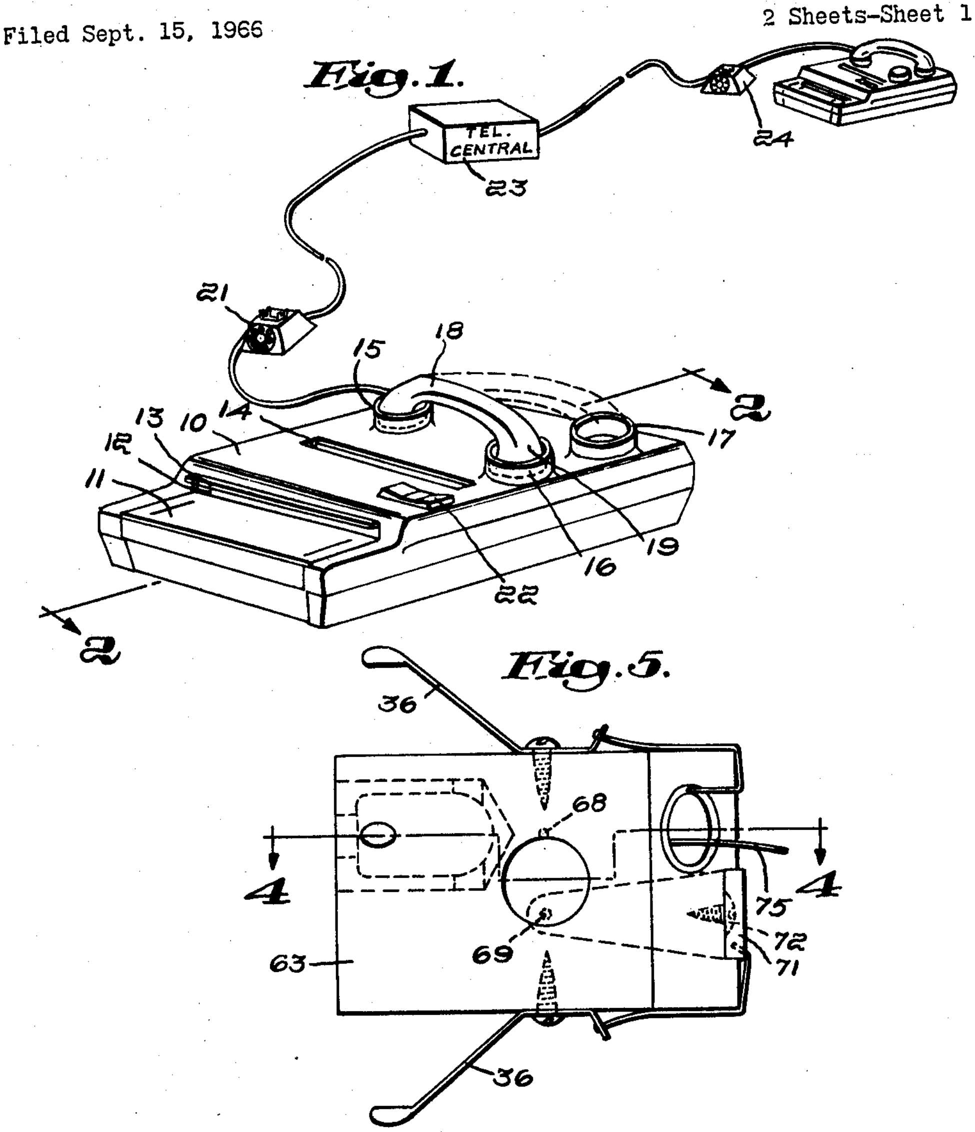
FIG. 1 is a perspective view representing the unitary unit of the invention with a representation of the switched telephone network and its utilization for connection to a similar remotely located unit.

Referring now to FIG. 1 the unit is shown as having a case 10 which is generally the size and shape of an office dictating machine and suitable for placing on a desk top or other convenient location. The forward portion of the casing 10 has a recessed step 11 which serves as a horizontal feed plate to insert sheets into a slot 12 which is located at the termination of the converging guide formed by the horizontal step 11 and an inclined lip 13. Directly behind the slot 12 is the entrance nip of the vertical drive system as will be hereinafter described. The upper portion of the casing 10 has a slot opening 14 from which the original copy emerges when the unit is transmitting and from which the facsimile copy emerges when the unit is receiving.

The rear surface of the casing 10 is provided with a telephone mouthpiece cup 15 in the base of which is located a sound insulating pad positioned to cup the telephone mouthpiece and fit tightly thereacross thereby to deaden all direct acoustic coupling to the telephone transmitter mouthpiece. Two earpiece receiving cups 16 and 17 are also located on the casing 10. A telephone handset 18 is shown with an earpiece 19 located in the receiving guide 16. In each of the guides 16 and 17 an inductive coil is located which encircles the telephone earpiece when the telephone instrument 18 is positioned as shown in either of alternate positions indicated in FIG. 1. When so encircling the earpiece the coils within the guides 16, 17 are inductively coupled to the earpiece coil within the telephone instrument and the respective coils in the guide 16 and 17 are used for reception and transmission of facsimile messages to an from the telephone line interconnecting the local set with a remote similar set.

As indicated the telephone handset is removed from the ordinary dial telephone 21 and earpiece 19 is placed in one or the other of the guides 16 or 17 depending on whether transmission or reception is to take place. A send-receive switch 22 is also provided to change the electrical connections internally in order that transmission or reception can take place as desired. Binary signal translation unit 20 processes the signals between one of the coils in receptacles 16 and 17 and the photo responsive pick-up or stylus in the scan head hereinafter described. The details of the electronics for translation unit 20 preferred for use with the present invention are disclosed in the application of Salaman and Picchiottino entitled "Binary Facsimile System," Ser. No. 579,591, filed Sept. 15, 1966. The local telephone instrument 21 is connected in the usual way through a switched central station 23 to any remote subscriber station 24 using the ordinary dial or operator conected circuits.

Figure 2:
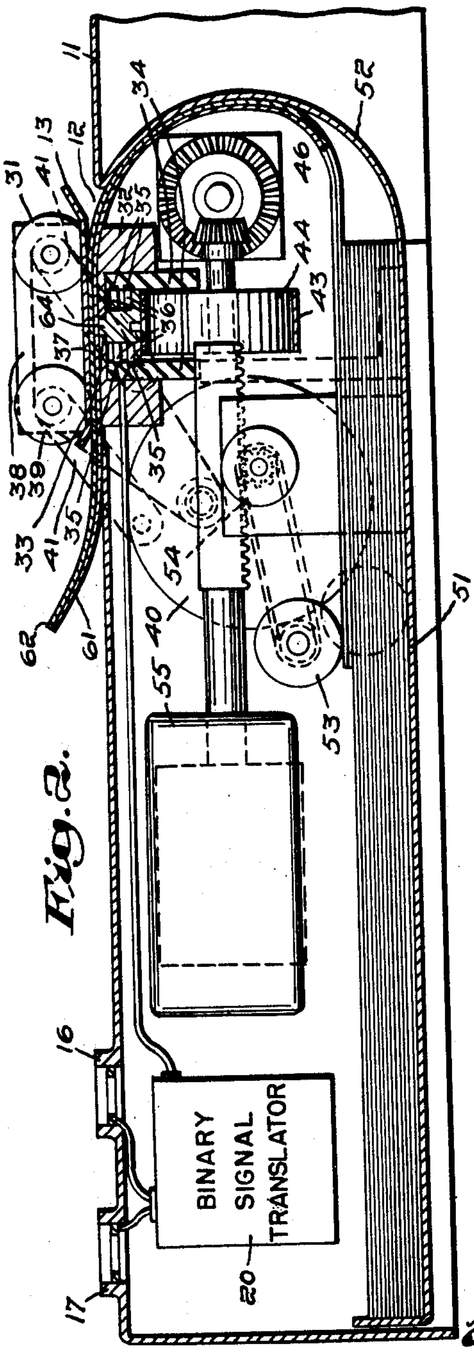
FIG. 2 is a side view partly in section and fragmentary as to the outer case of the unit of FIG. 1 taken approximately along the line 2—2 of FIG. 1.

Referring now to FIG. 2 the details of the scanner-printer will be described. The slot 12 formed between the flat step 11 and the extending lip 13 is positioned at an entrance nip formed between a roller 31 and a metallic platen 32 which has a machined slot 33 therein. The platen 32 extends the full width of the machine as can be seen in FIG. 3 and the slot 33 extends for the full scan width of the scan head with the precisely machined edges of the slot 33 acting as a guide for the scan head as it passes through the slot in paper scanning position.

Within the metal platen 32 are two dielectric strips 34 each having embedded therein two silver contact bars 35 to provide a total of four sliding contacts for the scan head. The metallic contact bars 35 are contacted by four sliding contacts supported by leaf springs 36 extending from the body of the scan head.

On and above the platen 32 is an assembly comprising a top plate 37, the extension of which forms the inclined guide 13, with end plates 38 in which the roller 31 is journaled. An exit roller 39 is also journaled in the plates 38. The top plate 37 and the end plates 38 with the rollers 31, 39 are supported on a linkage 41 which permits the entire assembly to rise upwardly for the purpose of servicing the scanning head and removing paper sheets which may become jammed during operation of the device. The weight of the entire assembly is adequate for holding paper between the top plate 37 and the top surface of platen 32 with the requisite pressure for printing as hereinafter described. The rollers 31, 39 are belt driven from a motor 40.

Figure 3:
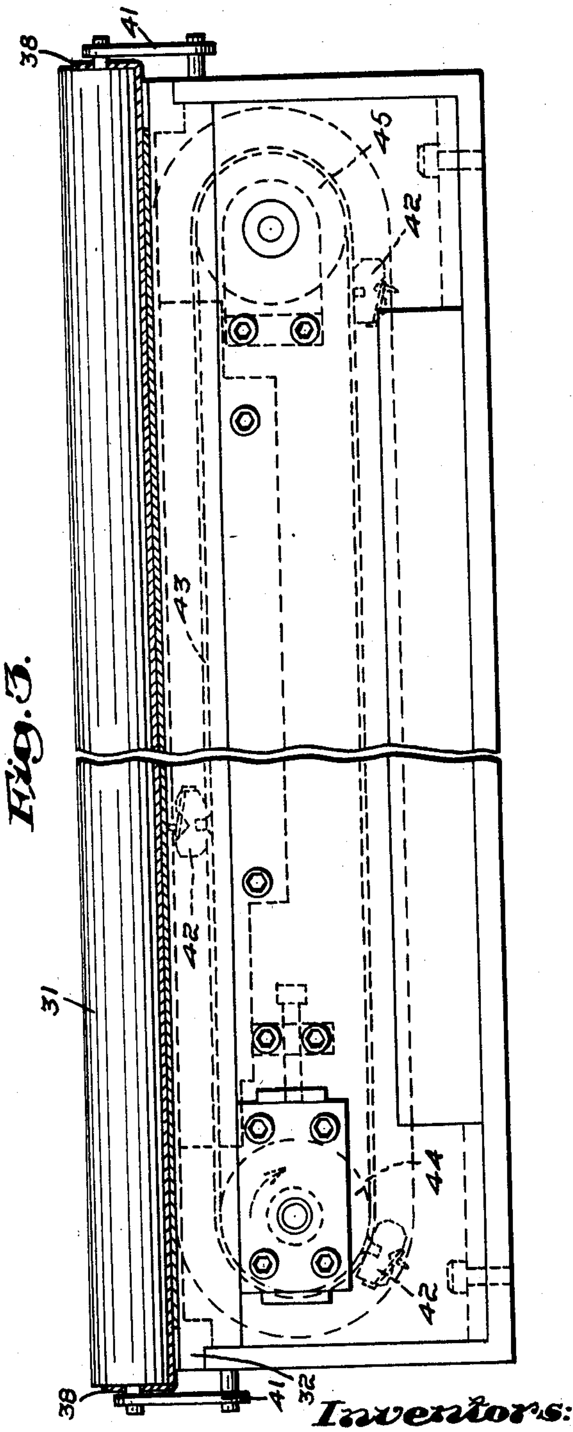
FIG. 3 is a front elevational view of the unit of FIG. 1 with the paper tray and guide removed showing the horizontal scanning arrangement of the unit.

The scan heads 42 are shown in FIG. 3 where three such heads are mounted an equal distance apart on a flexible belt 43 which runs between spaced pulleys 44 and 45. The pulley 44 is driven by a scan motor 46 (shown in FIG. 2) which is controlled to be in synchronism with the cooperating remote unit 24. The spacing between the pulleys 44 and 45 is such that it is possible to have a normal at rest position for the scan heads 42 such that the entrance into the nip betwen the roller 31 and platen 32 and across the slot 33 to the nip between the roller 39 and the top surface of platen 32 is unobstructed. This is the normal at rest position for the scan heads 42 so that paper can be fed prior to transmission of a message without interference from the stylus mounted on the scan heads 42.

In receiving mode for the purpose of feeding the received paper and foil sheet assemblies into the entrance nip under the roller 31, a tray 51 is provided which is slidable to be removed from the unit for reloading. The tray 51 has a forward curved guide 52 the inner surface of which guides sheets from the top of the stack to the entrance nip under roller 31 if the sheets are advanced from left to right in the view shown in FIG. 2. To accomplish this motion a rubber roller 53 rests on the top sheet in the stack resting in the tray 51 and is driven in rotation through a one way clutch and by belt connection to a rack and pinion assembly 54. The rack 54 is translated by the operation of a solenoid 55 which is energized at an appropriate time whenever paper feed from the stack in tray 51 to the scanning position is required. The solenoid has a spring return not shown.

The arrangement of FIGS. 2 and 3 provides for printing on a composite sheet comprising a sheet of thin metal foil 61 which is bonded at least along one or more edges to a paper sheet 62. The surface of the foil 61 which is in contact with the paper 62 has coated thereon a thermal transfer colored compound which upon the application of current to the stylus on the scanning head to produce localized heating, transfers to the surface of the paper 62. This transfer takes place by virtue of the spring urged contact of the stylus of the scanning head with the conductive surface of the foil 61 as the scanning head moves in the slot 33 and presses into the foil which is backed up by the surface of the platen 37. The pressure with which the stylus presses into the foil is controlled by the dimensions involved and generally is selected to lightly emboss the surface of the foil along the scan line in which the stylus moves. This amount of pressure is effective to clear away the oxide which forms on the foil, such as aluminum oxide if the foil is made of aluminum, with the result that reliable electrical contact is made between the stylus and the foil surface. The contact resistance at this point however is higher than at other points in the all metallic circuit formed by the foil 61 and the stylus and hence a maximum heating occurs at this junction. The return electrical contact with the foil 61 is provided by the metallic surface of platen 32 which has the foil urged into contact therewith by the pressure from the rollers 31 and 39. If desired the platen 32 can be fitted with grounded metallic rolls to form a nip under either or both of the rubber rollers 31, 39 with the metal roll contacting the foil 61 to complete the electric circuit while advancing the foil 61 and paper 62. The details of this printing process are given in greater detail in the application of Salaman and Taylor, Ser. No. 579,772, filed Sept. 15, 1966 (now Patent No. 3,441,940), entilted "Process for Electro-Junction Thermography." The preferred foil is disclosed in the application of Salaman et al., Ser. No. 579,605, filed Sept. 15, 1966, entitled "Electro-Junction Thermographic Transfer Sheet."

Figure 4:
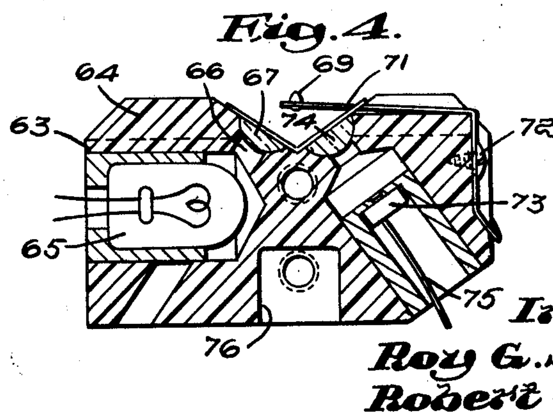
FIG. 4 is a sectional view of the scanning head along the line 4—4 of FIG. 5; and, FIG. 5 is a plan view of the unit of FIG. 4 looking at the lower surface of the FIG. 4 view.

Referring now to FIGS. 4 and 5 the scan head will be described. The scan head comprises a body 63 which is preferably of linen based phenolic with recessed shoulders to form the guide projection 64 that fits in the slot 33. Located in a horizontal bore hole within the body 63 is a lamp 65 which illustrates the copy being scanned by means of a hole 66 and a focusing lens 67 which produces a bright spot focus surrounding the point 68. Aligned with the point 68 in FIG. 4 but orthogonally offset with respect thereto is a metallic stylus 69 which is carried by a leaf spring 71 that is secured to one edge of the block 63 by means of a screw 72. With this arrangement the points 68 and the stylus 69 are aligned transverse to the direction of scan. The leaf spring 71 provides the desired pressure on the stylus preferably sufficient to lightly emboss the metal foil without tearing as the stylus is scanned over the foil.

A photo-transistor 73 is mounted in a hole in the body 63 and has the illumination at spot 68 focused thereon by means of a lens 74 so that the changes from black to white on the sheet being scanned that are illuminated at the spot 68 produce corresponding signal changes in an output lead 75 of the photo-transistor 73.

The head 63 is mounted on the belt 43 by means of a snap fitting into a hole 76 which provides essentially a pivot connection so that the belt 43 can go around the relatively small radius of the pulleys 44 without any flattening due to the attachment of the head 63.

The four leaf spring contacts 36 (shown in FIGS. 2 and 5) extend from both sides of the body 63 and provide four electrical contacts for the circuits involved. These circuits provide for energizing the lamp 65, coupling signals from the photo-transistor 73 and supplying printing current signals to the stylus tip 69.

The operation of the invention will now be described. For transmitting, the switch 22 is placed in SEND position and the telephone instrument 18 is located in the appropriate receptacle containing the coupling coil which is to have the local scan derived facsimile signals impressed thereon. By this means facsimile signals are coupled through the telephone earpiece coil 19 onto the telephone line for transmittal to the remote station 24 which has been connected by ordinary dialing or an operator switching network. The copy to be transmitted is placed on the step 11 and guided into the slot 12 where it passes under the rollers 31 and 39 at a uniform speed by means of motor drive 40 during which it is scanned in successive lines by the motion of the heads 42 on the belt 43. The speeds of the rollers 31 and 39 and of the belt 43 are coordinated so that each scan head 42 scans successively spaced lines on the sheet. When the focused light point 68 passes a dark area on the copy, the change in reflectivity of the copy surface is sensed by the photo-transistor 73 which in turn produces a print signal in the output lead 75. The print signal then passes through one of the leaf spring contacts 36 to a contact bar 35 from whence it passes to the binary translation unit 20 for transmission to the receiving station. As the copy is scanned it emerges from the slot 14.

For receiving copy the switch 22 is placed in the RECEIVE position and the telephone receiver is moved to the other receptacle 17 adapted to be inductively coupled to the earpiece 19 and receive signals from the remote telephone instrument. The solenoid 55 is actuated to advance a foil and paper set 61, 62 from the top of the stack in the tray 51 and the drive rolls 31, 39 advance the foil and paper set past the scan line position at a predetermined speed. Once in position the scan motor 46 starts driving the pulleys 44, 45 in synchronism with the sending scan head and both the scan and paper feed continue until the full sheet is printed. As the heads 42 scan the foil and paper set 61, 62, the stylus 69 is urged into electrical contact with the foil 61 by the leaf spring 71. The facsimile applied to the stylus 69 from the binary translation unit 20 through one of the contact bars 35 to a contact 36 is binary in nature, that is, the only time a print signal is applied to the stylus 69 is when a dark spot on the copy is sensed by the photo transistor 73 at the sending station. When a print signal is applied to the stylus 69, current will flow across the electrically conductive junction contact between the foil 61 and the stylus 69. This current flow causes the temperature of the side of the foil opposite the foil-stylus contact point to rise without increasing the temperature of adjacent portions of the foil to cause a localized portion of the thermal transfer layer to fuse and to transfer from the foil 61 to the paper 62 to form an image thereon.

It will be apparent that modified mechanisms for obtaining the desired scan of a metal sheet with a conductive stylus for electro-junction thermography can be employed in view of the present teaching which is to be taken only as the present preferred embodiment. The invention is accordingly to be interpreted as including such modifications as come within the scope of the appended claims.

For the purpose of this disclosure the disclosures of the copending applications referenced herein and filed of even date herewith are hereby incorporated by reference.

We claim:

1. Apparatus for facsimile transmission over a switched telephone network comprising:

(a) signal coupling means for coupling to a telephone instrument for either transmission or reception of facsimile signals;

(b) a scanning head including a photo responsive element and a conductive stylus;

(c) means for translating electrical signals between said coupling means and said scanning head;

(d) means for line sequential scanning of said scanning head over a field;

(e) means selectively operable to connect said photo responsive element to supply the input to said means for translating or to supply current impulses from said means for translating to said conductive stylus;

(f) means for introducing to said field a sheet bearing indicia to be scanned by said photo responsive element;

(g) means for supporting a thin metal fail substantially coextensive with said field and in electrically conductive contact with said stylus;

(h) pressure means for continuously urging said stylus into electrically conductive contact with said foil when supported in said field;

(i) means for connecting said foil when supported in said field in circuit to conduct current impulses from said stylus by electrically conductive contact with said stylus, said foil being thin enough to conduct the heat generated by said current impulses through said foil to heat the opposite surface of said foil subjacent said stylus to a predetermined temperature without corresponding heating of the opposite surface of said foil adjacent said stylus; and (j) means responsive to said predetermined temperature for producing a visible mark on a record sheet in contact with said opposite surface of said foil in accordance with the position of said stylus and the time pattern of current impulses applied thereto.

2. Apparatus according to claim 1 in which said scanning head comprises a self contained light source, a photo responsive device and optical means in said head for focussing said source and said device on the same spot on a surface adjacent said head; and said conductive stylus carried by said head extending therefrom adjacent said spot.

3. Apparatus according to claim 2 and including means for scanning said head to move said stylus and said spot along closely adjacent parallel scan lines.

4. Apparatus according to claim 3 in which said head is mounted on an endless belt mounted on two spaced pulleys, and including means for driving said pulleys at a predetermined speed.

5. Apparatus according to claim 4 and including a guide bar mounted parallel to said belt extending between said pulleys, said guide bar having a precision slot therein to receive said head as said head moves between said pulleys.

6. Apparatus according to claim 5 in which said head has a flat contact surface for sliding engagement with an edge of said slot, and spring means for urging said flat contact surface against said edge of said slot.

7. Apparatus according to claim 1 and including a roll transport for moving sheets past a line scanning station, said roll transport having a driven input nip, an external guide positioned to direct sheets inserted in said guide into said nip, an internal bin for holding a stack of foil sheets, and means operable to feed said foil sheets from said bin to said input nip.

8. Apparatus according to claim 1 in which said means for translating includes means for converting the signals from said scanning head into a binary signal representing only black and white information, and means responsive to said binary signal for transmitting said information over said telephone network.

References Cited

UNITED STATES PATENTS

| | | | |
|---|---|---|---|
| 2,713,822 | 7/1955 | Newman | 178—6.6 X |
| 2,903,517 | 9/1959 | Ridings | 179—4 |
| 3,121,138 | 2/1964 | Murphy | 178—6.6 X |
| 3,164,435 | 1/1965 | Grafstein et al. | 178—6.6 X |

KATHLEEN H. CLAFFY, Primary Examiner

WILLIAM A. HELVESTINE, Assistant Examiner

U.S. Cl. X.R.

178—6.6